United States Patent [19]

Liu

[11] Patent Number: 5,057,130

[45] Date of Patent: Oct. 15, 1991

[54] CENTRIFUGAL COOLING DEVICE

[76] Inventor: Wen H. Liu, No. 139, Chunghua Rd., Miaoli City, Taiwan

[21] Appl. No.: 687,117

[22] Filed: Apr. 18, 1991

Related U.S. Application Data

[63] Continuation-in-part of Ser. No. 556,015, Jul. 20, 1990, abandoned.

[51] Int. Cl.$^5$ ............................................. B01F 3/04
[52] U.S. Cl. .................................... 55/230; 55/257.2; 261/89
[58] Field of Search ................. 261/89; 55/230, 257.2, 55/257.3

[56] References Cited

U.S. PATENT DOCUMENTS

| | | | |
|---|---|---|---|
| 543,005 | 7/1895 | Fleischer | 261/DIG. 11 |
| 1,169,919 | 2/1916 | Brassert | 55/257.2 |
| 1,636,949 | 7/1927 | Bassler | 261/89 |
| 2,163,474 | 6/1939 | Sloan | 55/230 |
| 2,661,936 | 12/1953 | DeVilbiss | 261/89 |
| 3,348,821 | 10/1967 | Martin et al. | 55/230 |
| 3,478,496 | 11/1969 | Keough | 261/89 |
| 3,669,421 | 6/1972 | Murphy | 261/89 |
| 3,882,205 | 5/1975 | Aoki | 261/89 |
| 4,687,603 | 8/1987 | Liu | 261/89 |
| 4,853,162 | 8/1989 | Liu | 261/89 |

Primary Examiner—Tim Miles
Attorney, Agent, or Firm—Poms, Smith, Lande & Rose

[57] ABSTRACT

A centrifugal cooling device includes a housing having a water tank, a water valve, an overflow pipe and an outlet at its lower portion. A number of louvers are provided on a perimeter and an upper portion of the housing with a number of long slits formed between. Each perimetrical louver includes an inner louver and an outer louver which are slanted downwardly toward each other. A gap is formed between each inner and outer louver. A ring portion is formed on an upper central portion of the housing. A number of fixed stands extend downwardly from the ring portion and a mounting means is attached to the lower ends of the fixed stands. A hole is centrally formed on the mounting means for the installation of the motor. A conical rotor plate is rotatably mounted on a spindle of the motor. Centrifugal blades are provided around an edge portion of an upper surface of the conical rotor plate. A plurality of fan blades are provided on an edge portion of an underside of the conical rotor plate. An output of an inlet tube for high temperature water is located at an inner side of the centrifugal blades.

2 Claims, 2 Drawing Sheets

CENTRIFUGAL COOLING DEVICE

BACKGROUND OF THE INVENTION

This is a continuation-in-part application of U.S. patent application Ser. No. 556,015 filed Jul. 20, 1990 which is now abandoned.

The present invention relates to an improved centrifugal cooling device, and in particular to an improved centrifugal cooling tower designed for the elimination of stabilization problems during rotation of the motor, and to decrease the loss of circulating water.

Applicant's U.S. Pat. No. 4,687,603 discloses a cooling tower of the counter-flow forced-draft type, in which the cooling efficiency is increased by the provision of a motor, a rotating cylinder, and a cylindrical net-like screen. A sprayer head is attached to a piping, through which the high temperature water is inducted, to disperse the high temperature water into droplets so as to increase the heat exchange between the high temperature water and the low temperature air drawn into the cooling tower via the louvers provided under the outer structure of the cooling tower. Nevertheless, such a cooling tower still has several drawbacks in water collection, stabilization problems during rotation of the motor, etc.

Applicant's U.S. Pat. No. 4,853,162 discloses an improved centrifugal cooling device in which the housing is provided with a plurality of long slits between the louvers. The motor of the cooling device is supported by a post. Means are provided to stabilize the rotation of the performated drum. A screen structure is disposed above the fan and close to the inner side of the upper end of the housing for the collection of water vapor. However, stabilization problems still exists during the rotation of the motor since there is a large distance between the free end of the motor and the fixed end of the post. Furthermore, part of the droplets escape from the cooling device via the slits between the louvers.

The present invention intends to provide an improved design for a centrifugal cooling device to obviate the aforementioned problems.

SUMMARY OF THE INVENTION

It is an object of the present invention to provide a centrifugal cooling device in which the motor operates in a stable manner.

It is another object of the present invention to provide a centrifugal cooling device in which the louvers consist of an inner louver and an outer louver which slant downwardly toward each other, to prevent water droplets from escaping from the cooling device.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
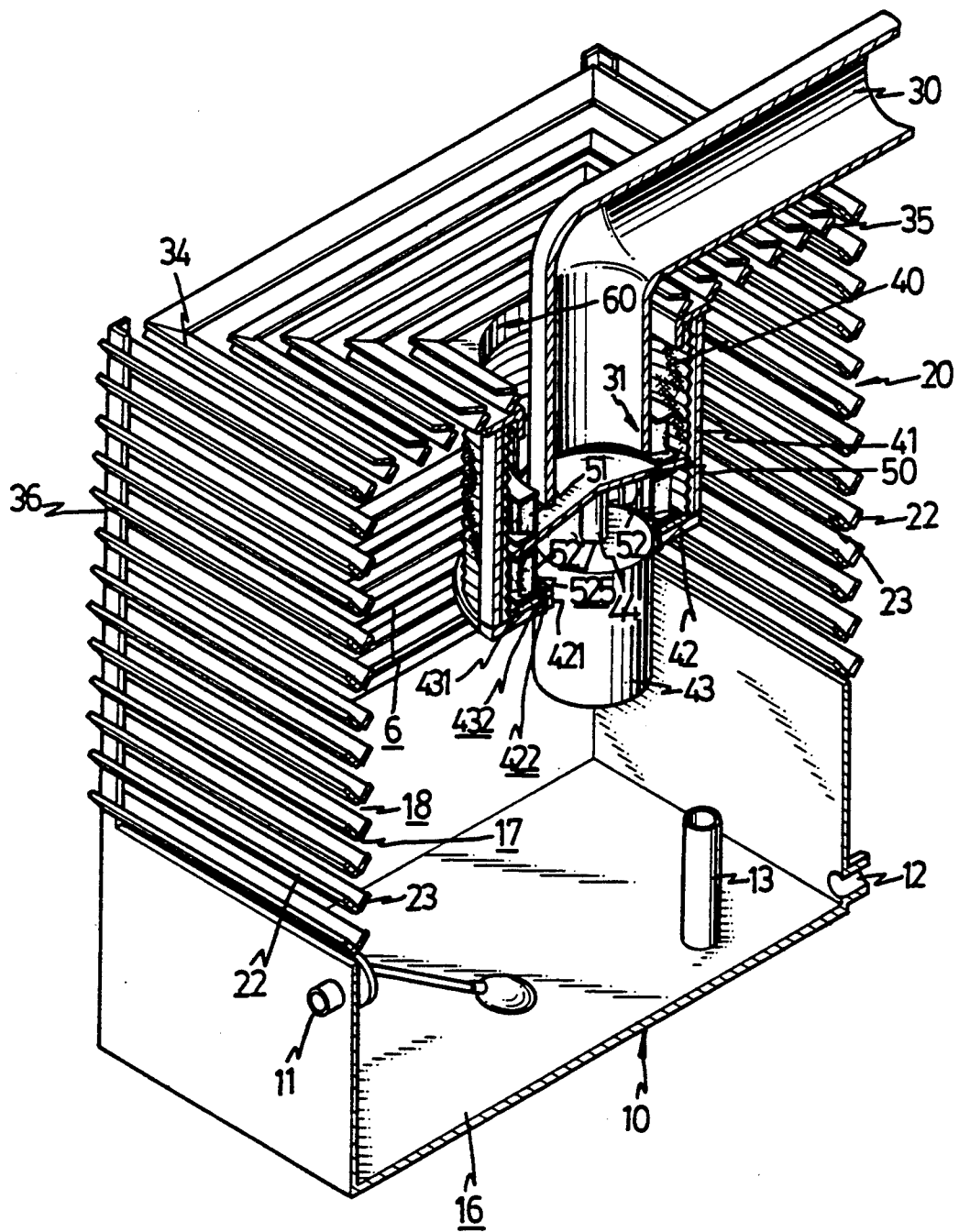
FIG. 1 is a perspective view of a cooling tower in accordance with the present invention.
Figure 2:
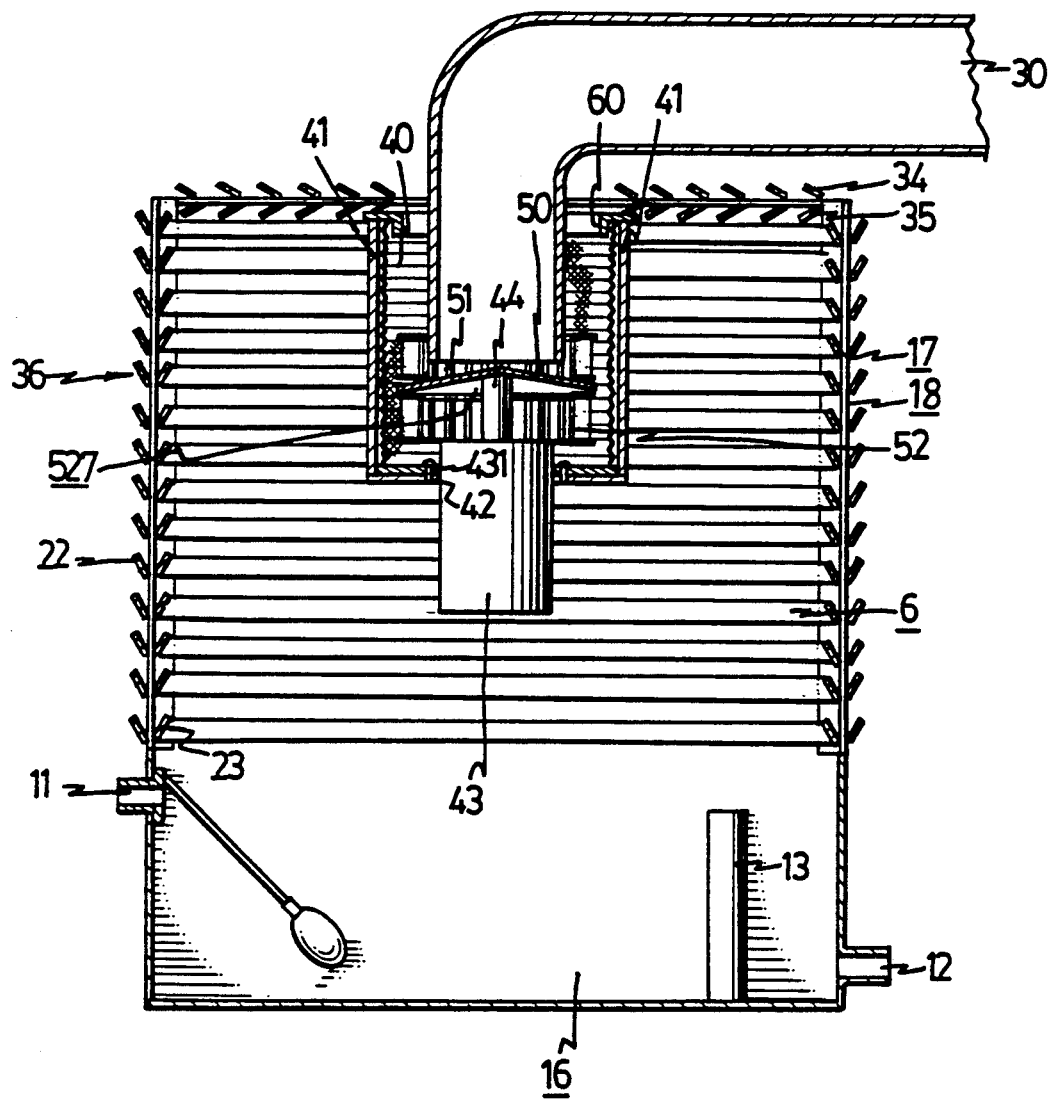
FIG. 2 is a plan view of the cooling tower.

FIGS. 1 and 2 show a large-size centrifugal cooling tower according to the present invention. The tower comprises a housing 10. A water storage tank 16 is formed at the bottom of the housing 10 where there is also located a floating water supply valve 11 as needed in a general cooling tower. An overflow pipe 13 and a water outlet 12 are also provided in the tower as needed in a general cooling tower, no explanation is required.

On the perimeter and the upper side of the housing 10, a plurality of long slits 18 are formed to facilitate the circulation of air. The long slits 18 are defined by louvers 34, 36 fitted in position by supports (not shown). A screen structure 35 is disposed below the upper louvers 34 for the collection of water vapor. Furthermore, each perimetrical louver 36 is consisted of an inner louver 23 and an outer louver 22 which are slanted downwardly toward each other. Between the inner louver 23 and the outer louver 22, there is a gap 17 formed.

A ring portion 60 is formed at an upper central portion of the housing 10. A plurality of fixed stands 41 extend downwardly from the ring portion 60, and a mounting means 42 is attached to the lower ends of the fixed stands 41. An annular screen member 40 is peripherally supported on the fixed stands 41. A hole 421 is centrally formed on the mounting means 42 for installation of a motor 43. Around the central hole 421 there is a plurality of mounting holes 422 provided on the mounting means 42. A plurality of tabs 431 extends from an upper portion of a periphery of the motor 43. On each tab 431 there is provided a positioning hole 432 relative to each mounting hole 422. The motor 43 is fixedly mounted to the mounting means 42 by providing screw nails passing through the positioning holes 432 and the mounting holes 422. It is noted that the motor 43 does not fill the hole 421. A gap or passage 525 is formed between the mounting means 42 and an outer periphery of the motor 43, through which air is passable, which will be discussed in detail later.

Above the motor 43, there is a conical rotor plate 50 rotatably mounted on the spindle 44 of the motor 43. A plurality of centrifugal blades 51 are provided around an edge portion of an upper surface of the conical rotor plate 50. The fan blades 52, the conical rotor plate 50, and the mounting means 42 together define a chamber 527 which communicates with the air passage 525. There is also a plurality of fan blades 52 provided on an edge portion of the underside of the conical rotor plate 50. As clearly shown in FIG. 1, an output 31 of an inlet tube 30, for carrying high temperature water, is located at an inner side of the centrifugal blades 51.

In use, the conical rotor plate 50 is driven at high speeds by the motor 43, which in turn drives the centrifugal blades 51 and the fan blades 52. The high temperature water is guided into the cooling tower via the inlet tube 30 and falls from the output 31 onto the upper surface of the conical rotor plate 50 at the inner side of the centrifugal blades 51. The high temperature water is thrown into contact with the annular screen member 40 by means of the centrifugal blades 51. When the high temperature water makes contacts with the annular screen member 40, it changes into fine water droplets or mist, and into water vapor. The fan blades 52, which are now revolving together with the conical rotor plate 50, draw in low temperature air from the outside environment through the long slits 18 between the louvers 22, 23 of the housing 10, and releases it into the heat exchange compartment 6, thereby resulting in a heat exchange between the low temperature air and the high temperature droplets and water vapor.

It is noted that the low temperature air is inducted from the outside environment through the long slits 18, then enters the chamber 527 via the air passage 525 from a lower side of the mounting means 42. The air is then expelled out of the chamber 527 and passes through the screen member 40 to the heat exchange compartment 6 due to the centrifugal force created by the fan blades. No air flows through the ring portion 60.

The water, when cooled, drops into the storage tank 16, and the water vapor that is floating about in the heat exchange compartment 6 condenses to form large-size drops when it comes into contact with the screen structures 5, and falls into the storage tank 16 so as to minimize the loss of water. Furthermore, since the inner louvers 23 and the outer louvers 22 slanted downwardly toward each other, the water droplets will flow down into the storage tank 16 via the gaps 17, regardless if the water droplets fall on the inner louvers or the outer louvers. Moreover, the stabilization problem caused by the motor 43 is largely obviated since the longitudinal lengths of both the centrifugal blades 51 and the fan blades 52 are shorter than these in conventional cooling towers. Furthermore, the mounting positions of the motor 43 and the rotor plate 50 are close to the fixed joints, i.e., the ring portion 60 and the mounting floor 42. Therefore, these reasons cause the motor to rotate stably and smoothly.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A centrifugal cooling device, comprising a housing, said housing including a water tank at a lower portion thereof, a valve to supply water, an overflow pipe and an outlet, the improvements comprising:

a plurality of louvers being provided on a perimeter and an upper portion of said housing, a plurality of long slits being formed between said louvers, each said perimetrical louver comprising an inner louver and an outer louver which are slanted downwardly toward each other, a gap being formed between each said inner louver and each said outer louver;

a ring portion being formed on an upper central portion of said housing, a plurality of fixed stands extending downwardly from said ring portion and a mounting means being fixedly attached to lower ends of said fixed stands, an annular screen member being peripherally supported on said fixed stands, a hole being centrally formed on said mounting means, said motor being fixedly mounted, in said hole, to said mounting means, a conical rotor plate being rotatably mounted, above said motor, on a spindle of said motor, a plurality of centrifugal blades being provided around an edge portion of an upper surface of said conical rotor plate, a plurality of fan blades being provided on an edge portion of an underside of said conical rotor plate, said fan blades, said conical rotor plate, and said mounting means together defining a chamber, a passage being defined between an outer periphery of said motor and said mounting means, through which air is passable from a lower side of said mounting means into said chamber, an output of an inlet tube for high temperature water being located at an inner side of said centrifugal blades.

2. A centrifugal cooling device as claimed in claim 1, wherein a plurality of mounting holes are provided on said mounting means around said central hole, a plurality of tabs extend from an upper portion of a periphery of said motor, each tab having a positioning hole formed thereon relative to each mounting hole.

* * * * *